US008743764B2

(12) United States Patent
Chen et al.

(10) Patent No.: US 8,743,764 B2
(45) Date of Patent: Jun. 3, 2014

(54) EXTENDING AN EFFECTIVE CONTROL CHANNEL PERIODICITY VIA DISCONTINUOUS RECEPTION (DRX)

(75) Inventors: Wanshi Chen, San Diego, CA (US); Hao Xu, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 13/030,032

(22) Filed: Feb. 17, 2011

(65) Prior Publication Data

US 2011/0205948 A1    Aug. 25, 2011

Related U.S. Application Data

(60) Provisional application No. 61/306,414, filed on Feb. 19, 2010.

(51) Int. Cl.
*H04W 52/02* (2009.01)

(52) U.S. Cl.
USPC ............ 370/311; 370/329; 370/318; 370/328

(58) Field of Classification Search
USPC ......... 370/311, 329, 252, 331, 328, 241, 342, 370/350; 455/515, 458, 522
See application file for complete search history.

(56) References Cited

U.S. PATENT DOCUMENTS

| | | | | |
|---|---|---|---|---|
| 6,587,697 | B2 * | 7/2003 | Terry et al. ..................... | 455/522 |
| 7,623,881 | B2 * | 11/2009 | An et al. ........................ | 455/515 |
| 7,941,626 | B2 * | 5/2011 | Marinier et al. .............. | 711/167 |
| 8,072,963 | B2 * | 12/2011 | Suzuki .......................... | 370/350 |
| 8,285,346 | B2 * | 10/2012 | Fodor et al. ................... | 455/574 |
| 2008/0186892 | A1 * | 8/2008 | Damnjanovic ................ | 370/311 |
| 2009/0168731 | A1 * | 7/2009 | Zhang et al. .................. | 370/336 |
| 2009/0232118 | A1 | 9/2009 | Wang et al. | |
| 2009/0239566 | A1 * | 9/2009 | Pelletier et al. ............... | 455/517 |
| 2009/0303939 | A1 * | 12/2009 | Umesh et al. ................. | 370/329 |
| 2009/0303969 | A1 * | 12/2009 | Lee et al. ...................... | 370/336 |
| 2009/0318177 | A1 * | 12/2009 | Wang et al. ................... | 455/515 |
| 2010/0034127 | A1 | 2/2010 | Iwamura et al. | |
| 2010/0110896 | A1 * | 5/2010 | Tseng et al. .................. | 370/241 |
| 2010/0110897 | A1 * | 5/2010 | Chun et al. .................... | 370/241 |
| 2010/0118815 | A1 * | 5/2010 | Kim et al. ..................... | 370/329 |
| 2010/0195605 | A1 * | 8/2010 | Suzuki et al. ................. | 370/329 |

(Continued)

FOREIGN PATENT DOCUMENTS

| | | |
|---|---|---|
| WO | WO2008023242 A2 | 2/2008 |
| WO | 2008069950 | 6/2008 |

OTHER PUBLICATIONS

Bontu C et al., "DRX mechanism for power saving in LTE", IEEE Communications Magazine, IEEE Service Center, Piscataway, US, vol. 47, No. 6, Jun. 1, 2009, pp. 48-55, XP011281824, ISSN: 0163-6804, DOI: DOI:10.1109/MCOM.2009.5116800.

(Continued)

*Primary Examiner* — Rasheed Gidado

(57) ABSTRACT

Discontinuous reception (DRX) operation may be utilized to maintain connection with user equipment (UE) by increasing the effective control channel transmission periodicity. UEs may be configured with a compatible control channel transmission periodicity such that multiple UEs may share a resource in a time-division-multiplexed manner using DRX offsets and periodicity, effectively extending control channel transmission periodicity through resource overloading.

19 Claims, 9 Drawing Sheets

(56) References Cited

U.S. PATENT DOCUMENTS

2010/0197316 A1    8/2010    Aoyama et al.
2010/0232366 A1    9/2010    Iwamura et al.
2011/0128865 A1*  6/2011    Doppler et al. ............... 370/252

OTHER PUBLICATIONS

Ericsson: "Signaling of DRX Start Offset", 3GPP Draft, R2-085387 (Signaling of DRX Start Offset), 3rd Generation Partnership Project (3GPP), Mobile Competence Centre : 650, Route Des Lucioles, F-06921 Sophia-Antipolis Cedex, France, No. Prague, Czech Republic, 20080923, Sep. 23, 2008, XP050320231, [retrieved on Sep. 23, 2008].

International Search Report and Written Opinion—PCT/US2011/025501, ISA/EPO—May 16, 2011.

Taiwan Search Report—TW100105439—TIPO—Jul. 18, 2013.

* cited by examiner

EXTENDING AN EFFECTIVE CONTROL CHANNEL PERIODICITY VIA DISCONTINUOUS RECEPTION (DRX)

CROSS REFERENCE TO RELATED APPLICATIONS

This application claims the benefit of U.S. provisional patent application No. 61/306,414, entitled METHOD AND APPARATUS FOR EXTENDING AN EFFECTIVE CONTROL PERIODICITY VIA DISCONTINUOUS RECEPTION, filed Feb. 19, 2010, in the names of CHEN et al., the disclosure of which is expressly incorporated herein by reference in its entirety.

BACKGROUND

1. Field

Aspects of the present disclosure relate generally to wireless communication systems, and more particularly to extending an effective control channel periodicity via discontinuous reception (DRX).

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed.

SUMMARY

A method for wireless communication is offered. The method includes establishing a communication with multiple wireless terminals. The method also includes assigning a compatible discontinuous reception periodicity and a common control resource to the wireless terminals. The method further includes ascertaining a unique discontinuous reception offset for each of the wireless terminals. The method further includes configuring at least one use of the common control resource based on the compatible discontinuous reception periodicity and a corresponding unique discontinuous reception offset.

An apparatus operable for wireless communication is offered. The apparatus includes means for establishing a communication with multiple wireless terminals. The apparatus also includes means for assigning a compatible discontinuous reception periodicity and a common control resource to the wireless terminals. The apparatus further includes means for ascertaining a unique discontinuous reception offset for each of the wireless terminals. The apparatus further includes means for configuring at least one use of the common control resource based on the compatible discontinuous reception periodicity and a corresponding unique discontinuous reception offset.

A computer program product operable to wirelessly transmit data over a communications link is offered. The computer program product includes a computer-readable medium having program code recorded thereon. The program code includes program code to establish a communication with multiple wireless terminals. The program code also includes program code to assign a compatible discontinuous reception periodicity and a common control resource to the wireless terminals. The program code further includes program code to ascertain a unique discontinuous reception offset for each of the wireless terminals. The program code further includes program code to configure at least one use of the common control resource based on the compatible discontinuous reception periodicity and a corresponding unique discontinuous reception offset.

An apparatus operable to wirelessly transmit data over a communications link is offered. The apparatus includes at least one processor and a memory coupled to the at least one processor, the at least one processor being configured to establish a communication with multiple wireless terminals, assign a compatible discontinuous reception periodicity and a common control resource to the wireless terminals, ascertain a unique discontinuous reception offset for each of the wireless terminals, and configure at least one use of the common control resource based on the compatible discontinuous reception periodicity and a corresponding unique discontinuous reception offset.

A method for wireless communication is offered. The method includes receiving a discontinuous reception periodicity, discontinuous reception offset, and common control resource assignment from a base station. The method also includes communicating with the base station on the common control resource using the discontinuous reception periodicity and discontinuous reception offset.

An apparatus operable for wireless communication is offered. The apparatus includes means for receiving a discontinuous reception periodicity, discontinuous reception offset, and common control resource assignment from a base station. The apparatus also includes means for communicating with the base station on the common control resource using the discontinuous reception periodicity and discontinuous reception offset.

A computer program product operable to wirelessly transmit data over a communications link is offered. The computer program product includes a computer-readable medium having program code recorded thereon. The program code includes program code to receive a discontinuous reception periodicity, discontinuous reception offset, and common control resource assignment from a base station. The program code also includes program code to communicate with the base station on the common control resource using the discontinuous reception periodicity and discontinuous reception offset.

An apparatus operable to wirelessly transmit data over a communications link is offered. The apparatus includes at least one processor and a memory coupled to the at least one processor, the at least one processor being configured to receive a discontinuous reception periodicity, discontinuous reception offset, and common control resource assignment from a base station, and communicate with the base station on the common control resource using the discontinuous reception periodicity and discontinuous reception offset.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
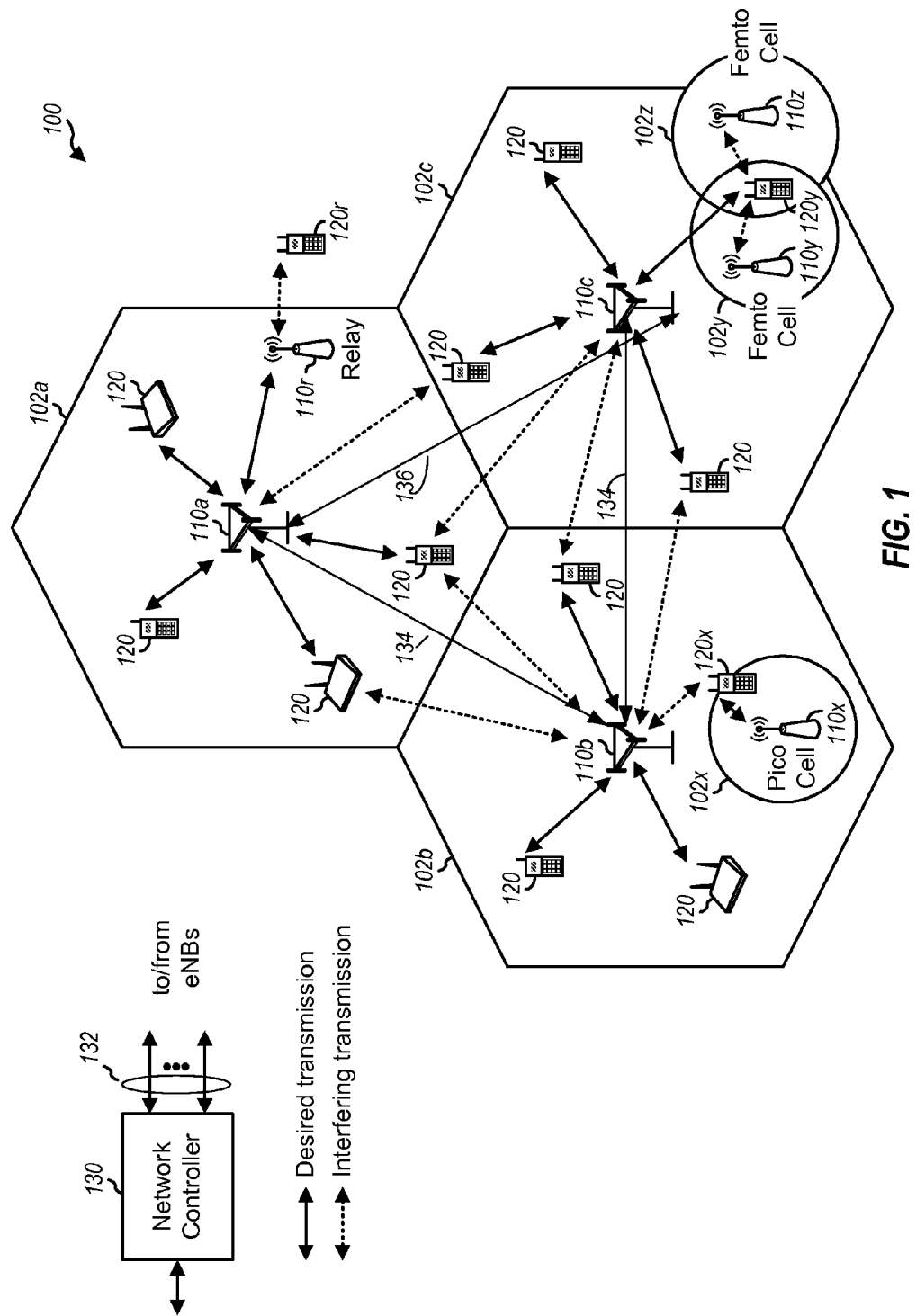
FIG. 1 is a block diagram conceptually illustrating an example of a mobile communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE/-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. The eNodeB 110x may communicate with UE 120x. And, the eNodeBs 110y and 110z are femto eNodeBs for the femto cells 102y and 102z, respectively. UE 120y may be inside the transmission range of eNodeBs 110y and 110z. An eNodeB may support one or multiple (e.g., two, three, four, and the like) cells.

The wireless network 100 also includes relay stations. A relay station is a station that receives a transmission of data and/or other information from an upstream station (e.g., an eNodeB, a UE, or the like) and sends a transmission of the data and/or other information to a downstream station (e.g., another UE, another eNodeB, or the like). A relay station may also be a UE that relays transmissions for other UEs. In the example shown in FIG. 1, a relay station 110r may communicate with the eNodeB 110a and a UE 120r, in which the relay station 110r acts as a relay between the two network elements (the eNodeB 110a and the UE 120r) in order to facilitate communication between them. A relay station may also be referred to as a relay eNodeB, a relay, and the like.

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for synchronous or asynchronous operations.

In one aspect, the wireless network 100 may support Frequency Division Duplex (FDD) or Time Division Duplex (TDD) modes of operation. The techniques described herein may be used for FDD or TDD modes of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal (e.g., a wireless terminal), a mobile station, a subscriber unit, a station, or the like. A UE may be a cellular phone, a personal digital assistant (PDA), a wireless modem, a wireless communication device, a handheld device, a laptop computer, a tablet, a netbook, a smartbook, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB. According to an aspect of the present disclosure, a UE 120 communicating with a base station 110a hands over to a base station 110b without the base station 110a first preparing the base station 110b for the handover. Such a handover will be referred to as a "forward handover."

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
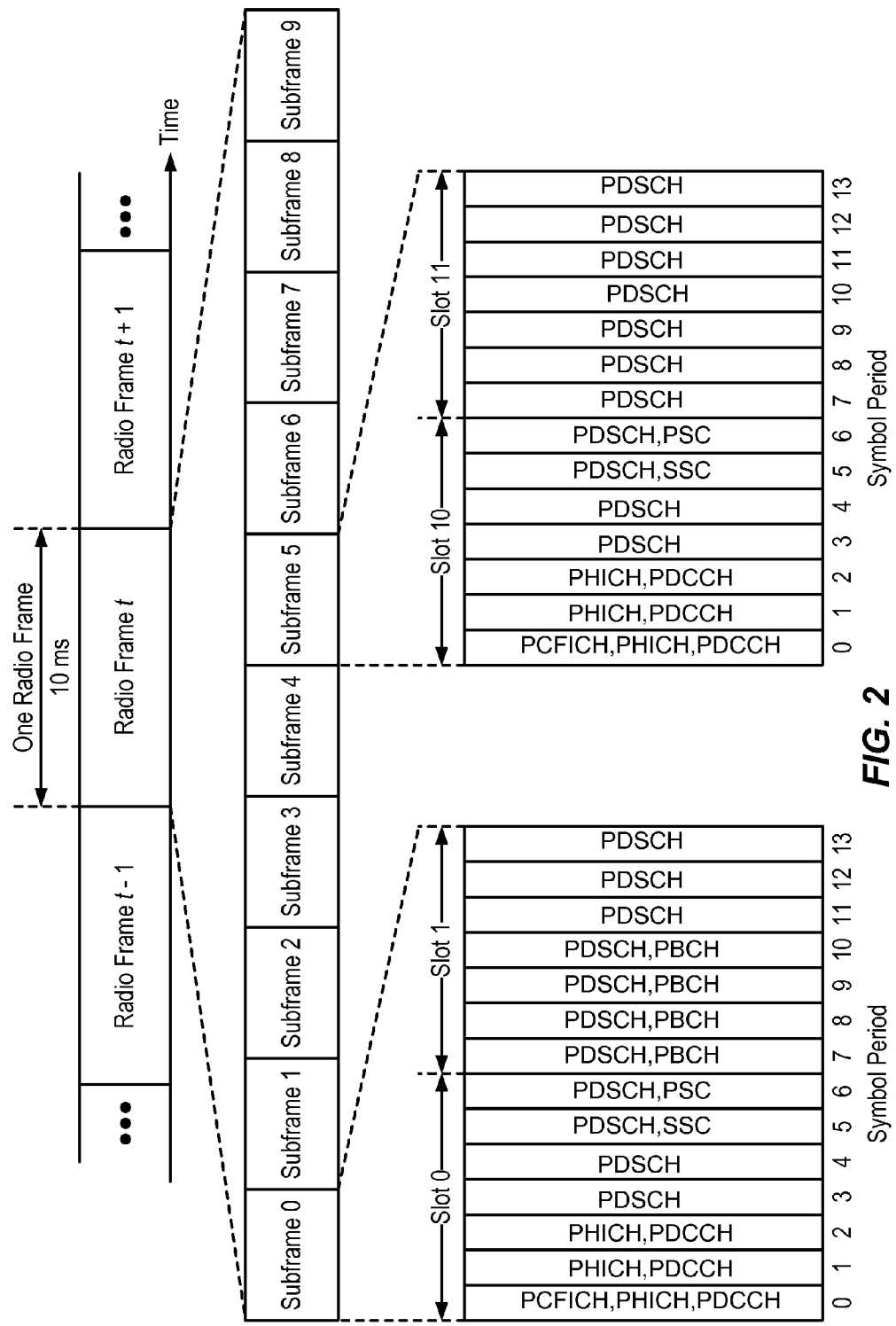
FIG. 2 is a block diagram conceptually illustrating an example of a downlink frame structure in a mobile communication system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 7 to 10 in slot 1 of subframe 0 (FIG. 2). The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
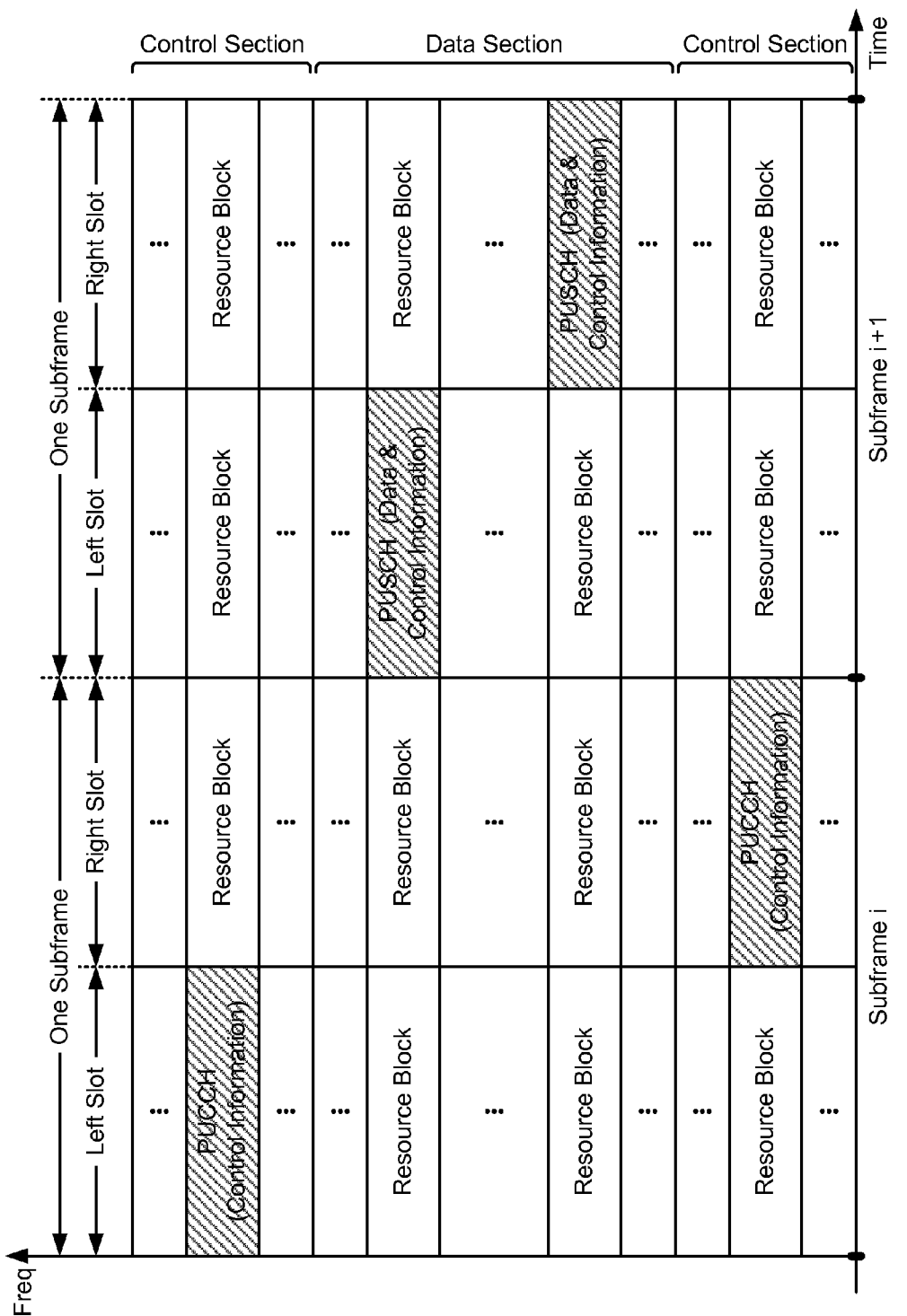
FIG. 3 is a block diagram conceptually illustrating an exemplary frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
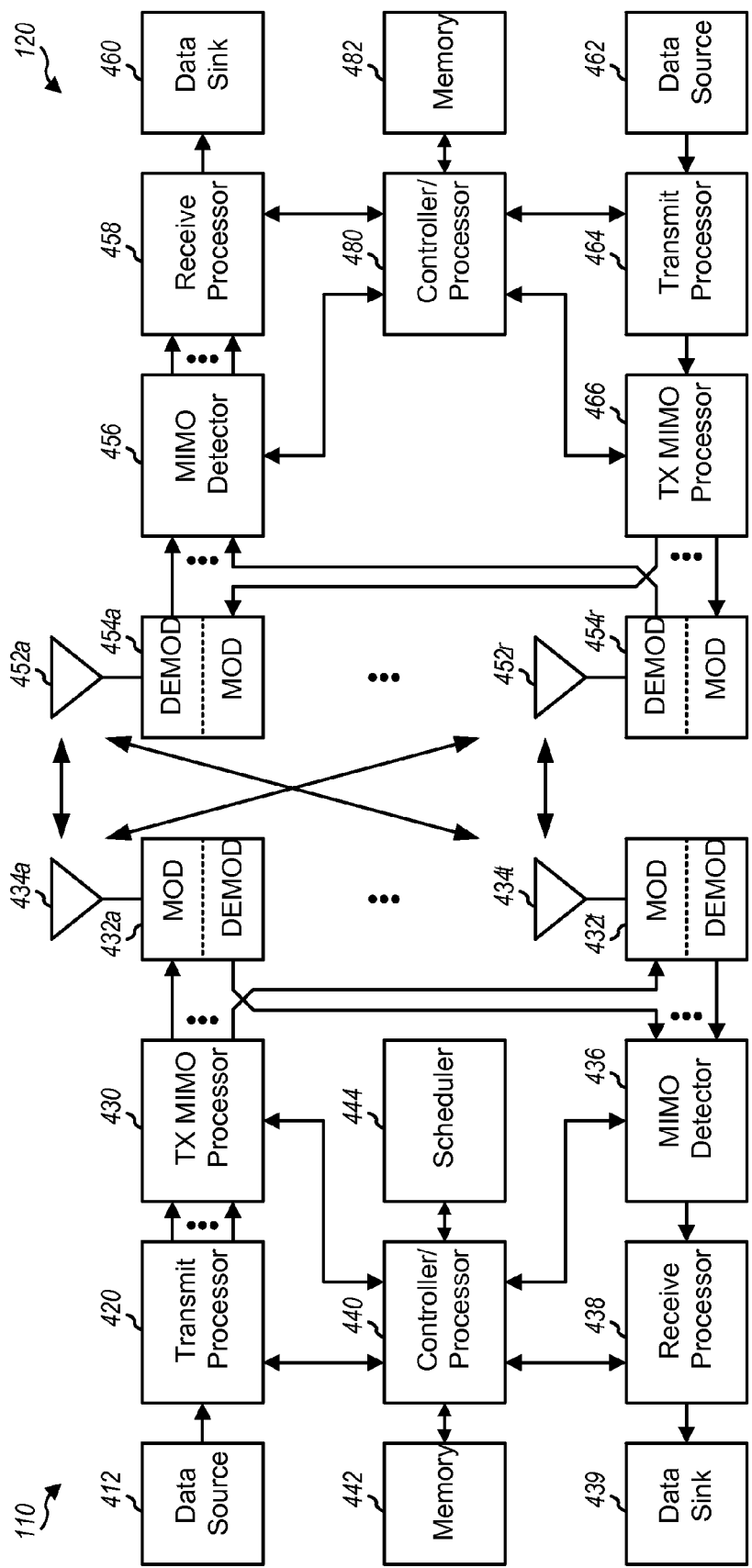
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send forward handover control messages to other base stations, for example, over an X2 interface.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of processes for the techniques described herein. The memories 442 and 482 may store data and program codes for the base station 110 and the UE 120, respectively. A scheduler 444 may schedule UEs for data transmission on the downlink and/or uplink.

The aspects disclosed herein are directed towards extending an effective control channel periodicity via discontinuous reception in LTE systems. To this end, it should be first noted that LTE UEs operate in two states RRC_IDLE (i.e., radio-resource-control idle mode) and RRC_CONNECTED (i.e., radio-resource-control connected mode). In order to support high volume UEs in RRC_CONNECTED mode without causing too much uplink overhead, there is a desire to configure some control channel transmissions with a largest possible periodicity. However, the largest periodicity for different control channels may be different, and the largest periodicity for some control channels may not be large enough to support desired UE volumes.

On the other hand, discontinuous reception (DRX) may be configured with a very large periodicity (e.g., in the order of seconds). When UEs are in a DRX state, UEs may not transmit control channels, such as CQI (channel quality indicator) and SRS (sounding reference signal). For comparison purposes, several exemplary transmission periodicities are provided, including an exemplary CQI reporting periodicity (up to 160 milliseconds), an exemplary SRS transmission periodicity (up to 320 milliseconds), an exemplary scheduling request (SR) transmission periodicity (up to 80 milliseconds), and an exemplary DRX periodicity (much larger, e.g., in the order of seconds). In an aspect disclosed herein, DRX may be utilized to increase the effective control channel transmission periodicity.

Figure 5:
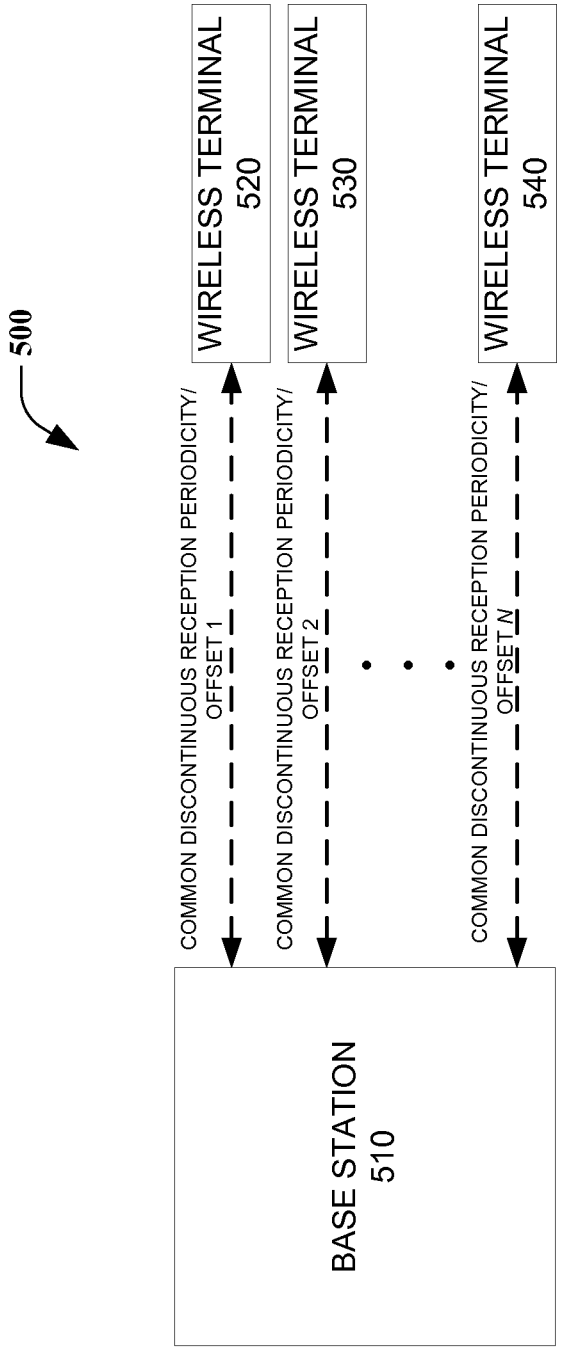
FIG. 5 is an illustration of an exemplary environment that facilitates extending an effective control periodicity via discontinuous reception according to an aspect.

In FIG. 5, an exemplary environment that facilitates extending an effective control channel periodicity via discontinuous reception is provided according to an aspect. As shown, an environment 500 includes a base station (eNB) 510 communicatively coupled to each of wireless terminal (UE) 520, wireless terminal 530, and wireless terminal 540. In an aspect, each of the wireless terminals 520, 530, and 540 is able to share the same control resource by utilizing a unique offset from a common discontinuous reception (DRX) periodicity. For example, four UEs may be configured with the same DRX periodicity of 640 ms and the same CQI periodicity of 160 ms. In order to effectively extend the CQI reporting periodicity, the first UE may have a DRX offset of 0 ms, the second UE may have a DRX offset of 160 ms, the third UE may have a DRX offset of 320 ms and the fourth UE may have a DRX offset of 480 ms.

By using DRX in such a manner, the effective control periodicity and multiplexing capability may thus be desirably extended. As a result, a group of UEs may be configured with the same or compatible DRX periodicity (e.g., 640 milliseconds). The set of UEs may also be configured with the same (e.g., a largest possible) or compatible control channel transmission periodicity (e.g., CQI 160 milliseconds) and may share the same resources for the control channel transmission. By compatible, it is meant that the periods are an integer multiple of another. Within such an aspect, however, DRX time offsets for the UEs in the set are configured to be different (staggered) such that at any given time, up to one UE is transmitting the control channel. Effectively, the same resource may thus be used by multiple UEs (i.e., resource overloading) and shared in a time-division-multiplexed (TDM) manner. Moreover, the effective control channel transmission periodicity is extended, and the multiplexing capability is increased as one resource may now support multiple UEs.

Figure 6:
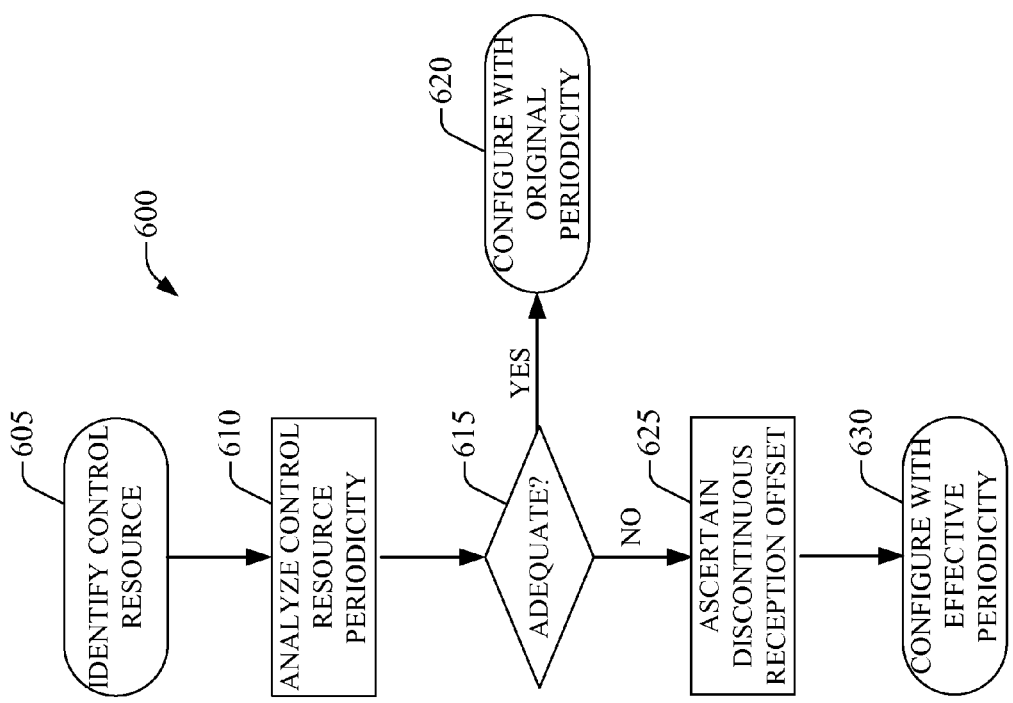
FIG. 6 is a flow chart illustrating an exemplary method that facilitates extending an effective control periodicity via discontinuous reception in accordance with an aspect of the present disclosure.

Referring next to FIG. 6, a flow chart illustrating an exemplary method for extending an effective control periodicity via discontinuous reception is provided. As illustrated, a process 600 includes a series of acts that may be performed by a base station or a wireless terminal. For instance, the process 600 may be implemented by employing a processor to execute computer executable instructions stored on a computer readable storage medium to implement the series of acts. In another aspect, a computer-readable storage medium having code for causing at least one computer to implement the acts of the process 600 is contemplated.

In an aspect, the process 600 begins with the identification of a control resource (e.g., a control channel associated with a channel quality indicator, a sounding reference signal, etc.) at block 605. Next, at block 610, a periodicity associated with the control resource identified at block 605 is analyzed.

A determination is then made at block 615 regarding the adequacy of the control resource's originally configured periodicity. Indeed, it is contemplated that the originally configured periodicity for some control resources may occasionally be adequate. In such circumstances, the process 600 proceeds to block 620 where the control resource is configured according to its original periodicity.

However, if the original periodicity is deemed inadequate, the process 600 proceeds by extending the effective control periodicity according to the aspects described herein. For this aspect, the process 600 proceeds to block 625 where a discontinuous reception offset is ascertained for this particular control resource and/or this particular wireless terminal Once the discontinuous reception offset is ascertained, process 600 concludes at block 630 where the control resource is configured according to an extended effective control periodicity based on the offset.

Figure 7:
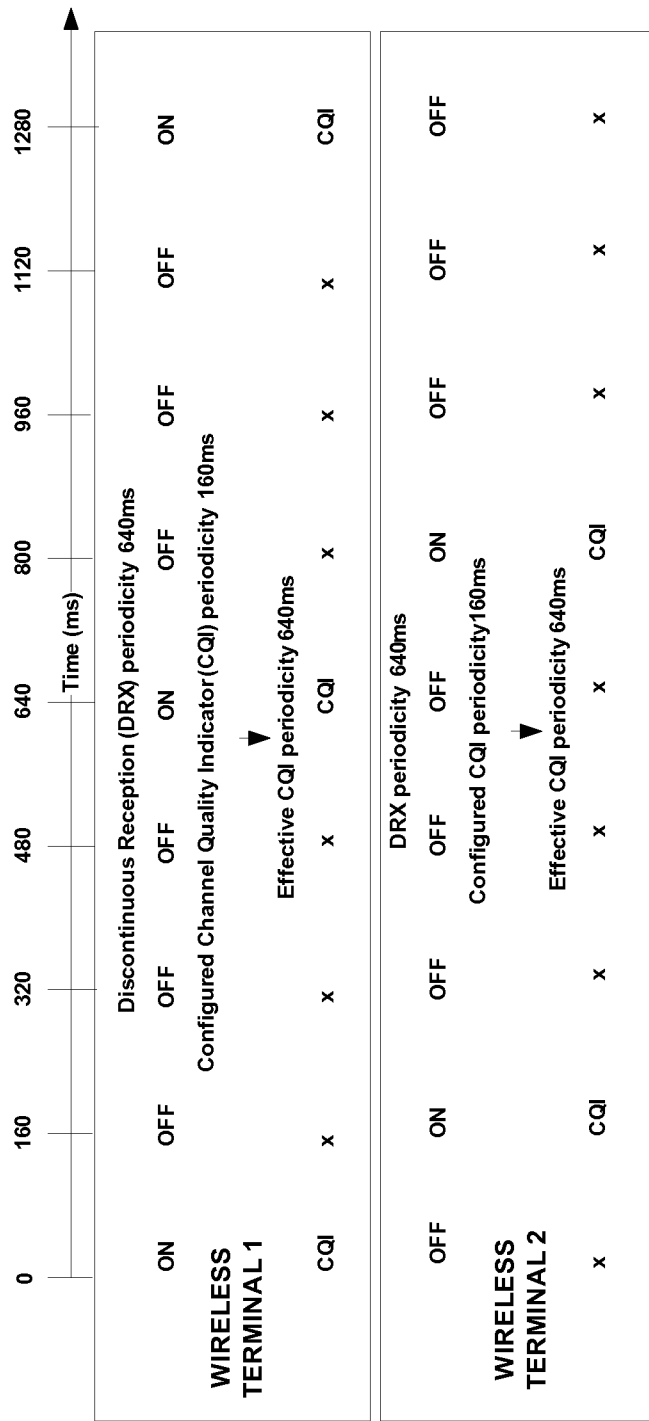
FIG. 7 is an illustration of an exemplary periodicity extension and multiplexing enhancement according to an aspect of the present disclosure.

Referring next to FIG. 7, an illustration of an exemplary periodicity extension and multiplexing enhancement is provided. Here, it should be noted that, for a DRX periodicity of 640 milliseconds and a CQI periodicity of 160 milliseconds, up to four wireless terminals may be multiplexed using the same uplink resource for the CQI transmission. For this particular example, however, only two wireless terminals are shown for simplicity. As illustrated, the two wireless terminals share the same resource in a time-division-multiplexed manner, which increases the effective CQI periodicity and improves multiplexing capability. This TDM aspect allows a resource to be overloaded and serve a greater number of UEs and to reduce the number of resources serving a given number of UEs. As shown, the offset for the first wireless terminals is zero, and the offset for the second wireless terminal is 160 ms.

Figure 8:
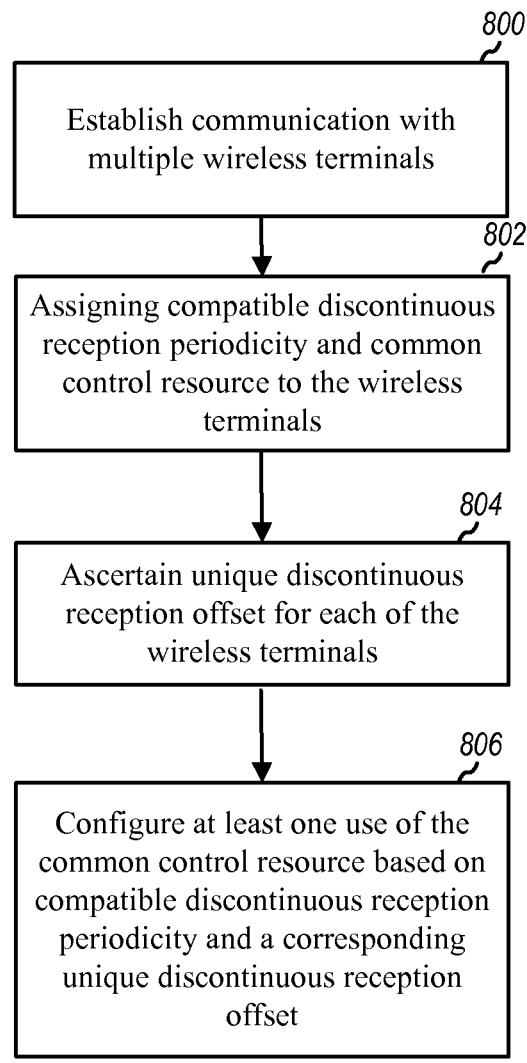
FIG. 8 is an illustration of an exemplary method of extending an effective control periodicity via discontinuous reception in accordance with an aspect of the present disclosure.

Referring next to FIG. 8, an eNB may execute a method for extending an effective control periodicity in a wireless communication environment. The eNB may establish a communication with multiple wireless terminals, as shown in block 800. The eNB may assign a compatible discontinuous reception periodicity and a common control resource to the wireless terminals, as shown in block 802. The eNB may ascertain a unique discontinuous reception offset for each of the wireless terminals, as shown in block 804. The eNB may configure at least one use of the common control resource based on compatible discontinuous reception periodicity and a corresponding unique discontinuous reception offset, as shown in block 806.

Figure 9:
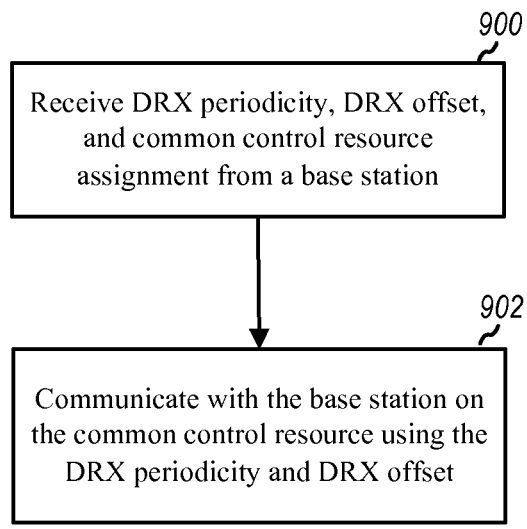
FIG. 9 is an illustration of an exemplary method of extending an effective control periodicity via discontinuous reception in accordance with an aspect of the present disclosure.

Referring next to FIG. 9, a UE may execute a method for extending an effective control periodicity in a wireless communication environment. The UE may receive a discontinuous reception periodicity, discontinuous reception offset, and common control resource assignment from a base station (900). The UE may communicate with the base station on the common control resource using the discontinuous reception periodicity and discontinuous reception offset (902).

In one configuration, an eNodeB 110 is configured for wireless communication including means for establishing communication with wireless terminals, means for assigning a discontinuous reception periodicity and common resource control, means for ascertaining a discontinuous reception offset, and means for configuring a common resource control based on the discontinuous reception periodicity and discontinuous reception offset. In one aspect, the aforementioned means may be the controller/processor 440, the transmit processor 420, and/or the scheduler 444. In another aspect, the aforementioned means may be a module or any apparatus configured to perform the functions recited by the aforementioned means.

In one configuration, a UE 120 is configured for wireless communication including means for receiving a discontinuous reception periodicity, discontinuous reception offset, and common control resource assignment from a base station and means for communicating with the base station on the common control resource using the discontinuous reception periodicity and discontinuous reception offset. In one aspect, the aforementioned means may include memory 482, controller/processor 480, receive processor 458, transmit processor 464, modulator/demodulator 454a-r and/or antenna 452a-r. In another aspect, the aforementioned means may include a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A processor-implemented method for wireless communication, the method comprising:
   establishing a communication with a plurality of wireless terminals;
   assigning a compatible discontinuous reception periodicity and a periodic common control resource to the plurality of wireless terminals;
   ascertaining, via a processor, a unique discontinuous reception (DRX) offset for each of the plurality of wireless terminals; and
   extending, via the processor, an effective periodicity of the periodic common control resource for each of the plurality of wireless terminals based at least in part on the compatible discontinuous reception periodicity and the unique discontinuous reception offset.

2. The method of claim 1 in which the compatible discontinuous reception periodicity comprises a common discontinuous reception periodicity.

3. The method of claim 1, in which the periodic common control resource comprises a control channel associated with at least one of a channel quality indicator and a sounding reference signal.

4. An apparatus operable for wireless communication, the apparatus comprising:
   means for establishing a communication with a plurality of wireless terminals;
   means for assigning a compatible discontinuous reception periodicity and a periodic common control resource to the plurality of wireless terminals;
   means for ascertaining a unique discontinuous reception offset for each of the plurality of wireless terminals; and
   means for extending an effective periodicity of the periodic common control resource for each of the plurality of wireless terminals based at least in part on the compatible discontinuous reception periodicity and the unique discontinuous reception offset.

5. The apparatus of claim 4 in which the compatible discontinuous reception periodicity is a common discontinuous reception periodicity.

6. The apparatus of claim 4, in which the periodic common control resource includes a control channel associated with at least one of a channel quality indicator or a sounding reference signal.

7. A computer program product operable to wirelessly transmit data over a communications link, comprising:
   a non-transitory computer-readable medium having encoded thereon program code to be executed by a processor, the program code comprising:
   program code to establish a communication with a plurality of wireless terminals;
   program code to assign a compatible discontinuous reception periodicity and a periodic common control resource to the plurality of wireless terminals;
   program code to ascertain a unique discontinuous reception offset for each of the plurality of wireless terminals; and
   program code to extend an effective periodicity of the periodic common control resource for each of the plurality of wireless terminals based at least in part on the compatible discontinuous reception periodicity and the unique discontinuous reception offset.

8. The computer program product of claim 7 in which the compatible discontinuous reception periodicity is a common discontinuous reception periodicity.

9. The computer program product of claim 7, in which the periodic common control resource is a control channel associated with at least one of a channel quality indicator or a sounding reference signal.

10. An apparatus operable to wirelessly transmit data over a communications link, the apparatus comprising:
    at least one processor; and
    a memory coupled to the at least one processor, the at least one processor being configured to:
    establish a communication with a plurality of wireless terminals;
    assign a compatible discontinuous reception periodicity and a periodic common control resource to the plurality of wireless terminals;
    ascertain a unique discontinuous reception offset for each of the plurality of wireless terminals; and
    extend an effective periodicity of the periodic common control resource for each of the plurality of wireless terminals based at least in part on the compatible discontinuous reception periodicity and the unique discontinuous reception offset.

11. The apparatus of claim 10 in which the compatible discontinuous reception periodicity is a common discontinuous reception periodicity.

12. The apparatus of claim 10, in which the periodic common control resource includes a control channel associated with at least one of a channel quality indicator or a sounding reference signal.

13. A method for wireless communication, the method comprising:
    receiving a discontinuous reception periodicity, discontinuous reception offset, and an assignment of a periodic common control resource from a base station; and
    communicating with the base station on the periodic common control resource using the discontinuous reception periodicity and discontinuous reception offset to extend an effective periodicity of the periodic common control resource.

14. The method of claim 13, in which the periodic common control resource comprises a control channel associated with at least one of a channel quality indicator and a sounding reference signal.

15. An apparatus configured for wireless communication, the apparatus comprising:
- means for receiving a discontinuous reception periodicity, discontinuous reception offset, and an assignment of a periodic common control resource from a base station; and
- means for communicating with the base station on the periodic common control resource using the discontinuous reception periodicity and discontinuous reception offset to extend an effective periodicity of the periodic common control resource.

16. The apparatus of claim 15, in which the periodic common control resource comprises a control channel associated with at least one of a channel quality indicator and a sounding reference signal.

17. A computer program product operable to wirelessly transmit data over a communications link, comprising:
- a non-transitory computer-readable medium having encoded thereon program code to be executed by a processor, the program code comprising:
  - program code to receive a discontinuous reception periodicity, discontinuous reception offset, and an assignment of a periodic common control resource from a base station; and
  - program code to communicate with the base station on the periodic common control resource using the discontinuous reception periodicity and discontinuous reception offset to extend an effective periodicity of the periodic common control resource.

18. The computer program product of claim 17, in which the periodic common control resource comprises a control channel associated with at least one of a channel quality indicator and a sounding reference signal.

19. An apparatus operable to wirelessly transmit data over a communications link, the apparatus comprising:
- at least one processor; and
- a memory coupled to the at least one processor, the at least one processor being configured to:
- receive a discontinuous reception periodicity, discontinuous reception offset, and an assignment of a periodic common control resource from a base station; and
- communicate with the base station on the periodic common control resource using the discontinuous reception periodicity and discontinuous reception offset to extend an effective periodicity of the periodic common control resource.

* * * * *